Patented Dec. 7, 1937

2,101,584

UNITED STATES PATENT OFFICE 2,101,584

METHOD FOR KILLING AND CONTROLLING ORGANISMS ON VARIOUS PLANT MATERIALS

Albert Horner, Kapaa, Kauai, Territory of Hawaii

No Drawing. Application June 22, 1934, Serial No. 731,886

3 Claims. (Cl. 21—60)

This invention relates to a method and means of treating plants and the like, and particularly pertains to a method and means of killing and controlling organisms on various materials.

In agricultural and horticultural operations the grower is often confronted with serious problems due to the fact that plants have been attacked by various harmful organisms and which it is very difficult to kill or otherwise drive from the plants. This is particularly true in tropical and semi-tropical countries, and especially in connection with an organism known as the mealy bug which is found on pineapple plants and is the vector insect for an organism (which is probably a virus) causing the disease of the pineapple known as "pineapple wilt". In protecting a field of pineapple plants from this disease it has been found that the control of the disease is in direct proportion to the reduction of the mealy bug population, and in view thereof various methods have been employed to reduce the population of mealy bugs to the lowest possible degree.

In practice it is common to plant the pineapple plants in straight rows. The border of the field is planted with a number of rows of plants parallel to the edge of the field and adjacent thereto. These border rows are separated from the field proper by a road. The road serves two purposes, one being to space the border rows from the plants in the main field, and the other is to provide a convenient highway along which spraying equipment carried on a traveling truck may move. It is common to use this spraying equipment to treat the border rows of plants with a suitable insecticide spray solution by which many of the mealy bugs are killed in the border plants. These plants are called the "guard rows", and as such make it possible to prevent the bulk of the field from becoming infested by mealy bugs from beyond the guard rows. In practice it has been found, however, that a large population of mealy bugs is carried into the field on the new plants when they are planted and thus do not enter the field by migration. Under such circumstances it is necessary to spray the entire field, this being so expensive if done effectively as to practically prevent broadcast spraying from becoming the regular practice, and in fact the magnitude of this task has made it impossible to effectively spray and clear up the field in the same thorough manner as was accomplished in the guard rows. It is the principal object of the present invention therefore to provide means for treating the young plants prior to the time that they are planted in the field and thus insuring that so far as mealy bugs and certain other organisms which would effect pineapple wilt is concerned the plants will be sterile. The present invention is practiced by treatment of the young plants which are commonly called planting material, which treatment includes immersion of the plants in either water or insecticide. It has been found preferable to use an insecticide emulsion of neutral oil which is placed in a pressure chamber and within which the emulsion and immersed plants are maintained for a predetermined period under a desired pressure. It will be understood that the emulsion used is non-injurious to the plant life, but tends to destroy the organic life associated therewith. A pressure which has been found suitable is an air or fluid pressure of seventy five pounds per square inch or more. The pressure thus exerted within the pressure chamber acts throughout the entire quantity of liquid contained therein and forces out the air entrapped under the leaves and bracts of the plant where mealy bugs are usually found and at which points treatment with ordinary gas, immersion or spray would not effectively reach them. The insecticide is thus forced by pressure against the entire surface of the plants and into all of the interstices so that the mealy bugs themselves are covered by the insecticide solution and are subjected to the pressure of the fluid. It is suitable to maintain this pressure for a period of at least fifteen minutes at which time the pressure is suddenly released. This results in a violent action and subjects the mealy bugs to three killing effects, to-wit; disruption of their bodies in some cases, caused by the release of pressure; the drowning action of the liquid where the mealy bugs have been released from the pressure and thereafter expanded so that they draw liquid into the air passages of their bodies; and the insecticidal action of the insecticide solution when this is used in the treatment instead of plain water. It will be evident that when subjecting the plant and associated organic life to this liquid under pressure the occluded air in the cell structure of the surface of the plants and organisms will be removed and will be supplanted by the insecticide liquid when the pressure imposed upon the liquid is released. This will cause the surface and external communicating air passageways of the organic life to be thoroughly treated and intimately covered with the insecticide solution. It will be evident that the quantity of plants which may be treated simultaneously depends entirely upon the size of the pressure chamber and on the compressed air supply. In actual practice it has been found that the treatment of the usual truck load of planting material at one time is a convenient unit. It will, of course, be understood that this method of treatment manifestly can be conveniently used in controlling other insects and organisms on other objects than pineapple plants, and that in any such cases the application of liquid under pressure and the violent release of the pressure will have the same desirable effects as previously described.

It is obvious that various changes and modifications may be made in the above specifically described embodiment of the apparatus of this invention without departing from the spirit thereof and the practical embodiment of the method of the present invention is not limited or dependent upon the use of particular apparatus or limited to the details of the preferred method as here described, but that both method and apparatus of the present invention include all such changes, modifications, substitutions, and equivalents as might be suggested by those skilled in the art without departing from the spirit of the invention hereof.

Having thus described my invention what I claim and desire to secure by Letters Patent is:

1. A method of killing mealy bugs, insects, animal organisms and fungi occurring upon plant life and plant parts which consists in placing said parts in a closed chamber, submerging said plants in a liquid destructive to the said objectionable foreign organisms thereon and applying pressure to said liquid of a degree incompatible with the life of said organisms and thereby driving air from the interstices of the living plants by forcing the liquid into the body of the plants and thereafter suddenly releasing said pressure.

2. A method of killing injurious surface organisms occurring upon plants which are to be subsequently planted, which consists in the immersion of the plant in an insecticide or fungicide solution, said operation taking place within a closed receptacle, and thereafter applying a fluid pressure to the receptacle at temperatures and pressures non-injurious to the plant but incompatible with the life of the surface organisms thereon, thus accomplishing a thorough coverage of the plant and penetration of the plant body by the treating solution and then reducing the fluid pressure to atmospheric pressure.

3. A method of killing mealy bugs and other insects and organisms occurring upon living plants, which consists in placing said plants in a closed container, submerging the same within a liquid incompatible with the life of the organisms, thereafter imposing pressure on the liquid in a degree harmful to the organisms and to force the air from the interstices of the plant and organic life and to displace the air with the liquid which is then forced into the body of the plant, thereafter suddenly reducing the pressure permitting the insecticide solution to replace the air thus removed whereby intimate contact of the insecticide solution is made with the entire surface of the plant and the organisms are destroyed.

ALBERT HORNER.